United States Patent
Hecht

(10) Patent No.: US 9,421,615 B2
(45) Date of Patent: Aug. 23, 2016

(54) CUTTING TOOL AND CUTTING INSERT HAVING EXACTLY FOUR CUTTING PORTIONS THEREFOR

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 230 days.

(21) Appl. No.: 14/249,844

(22) Filed: Apr. 10, 2014

(65) Prior Publication Data

US 2015/0290717 A1    Oct. 15, 2015

(51) Int. Cl.
*B23B 27/16* (2006.01)
*B23B 27/00* (2006.01)
(Continued)

(52) U.S. Cl.
CPC ......... *B23B 27/1662* (2013.01); *B23B 27/007* (2013.01); *B23B 27/04* (2013.01); *B23B 27/1622* (2013.01); *B23B 29/043* (2013.01); *B23B 2200/00* (2013.01); *B23B 2200/04* (2013.01); *B23B 2200/0423* (2013.01); *B23B 2200/08* (2013.01); *B23B 2200/086* (2013.01); *B23B 2200/12* (2013.01); *B23B 2200/121* (2013.01); *B23B 2200/123* (2013.01); *B23B 2200/128* (2013.01); *B23B 2200/286* (2013.01); *B23B 2200/369* (2013.01);
(Continued)

(58) Field of Classification Search
CPC ............... Y10T 407/25; Y10T 407/23; Y10T 407/2274; Y10T 407/2272; Y10T 407/2276; B23B 27/04; B23B 27/045; B23B 27/005; B23B 2210/022; B23B 2220/12; B23B 2220/123; B23B 27/16
See application file for complete search history.

(56) References Cited

U.S. PATENT DOCUMENTS

| 3,613,197 A | * | 10/1971 | Stier | B23B 27/065 407/113 |
| 4,906,145 A | * | 3/1990 | Oliver | B23C 5/2265 407/103 |
| 5,004,379 A | * | 4/1991 | Little | B23B 27/065 407/113 |

(Continued)

FOREIGN PATENT DOCUMENTS

| DE | WO 9507162 A1 * | 3/1995 | ............... B23C 5/08 |
| DE | WO 9834747 A1 * | 8/1998 | ............. B23C 5/202 |

(Continued)

OTHER PUBLICATIONS

Search report dated Oct. 20, 2015 issued in PCT counterpart application (No. PCT/IL2015/050259).

*Primary Examiner* — Sunil K Singh
*Assistant Examiner* — Donte Brown
(74) *Attorney, Agent, or Firm* — Womble Carlyle

(57) ABSTRACT

In a cutting tool having an indexable cutting insert with exactly four cutting portions, the cutting insert is removably securable to an insert holder by a fastener. The cutting insert has two opposing end surfaces with a peripheral side surface extending therebetween, and each cutting portion has a major cutting edge formed by the intersection of a rake surface and a relief surface. The peripheral side surface has first and second pairs of opposing side surfaces which include the four relief surfaces and the four rake surfaces, respectively. In an end view, four cutting points on the four major cutting edges define the transitions between the first and second pairs of opposing side surfaces, and a minimum first length dimension between the second pair of opposing side surfaces is less than six-tenths of a minimum second length dimension between two of the four cutting points.

21 Claims, 4 Drawing Sheets

(51) Int. Cl.
*B23B 27/04* (2006.01)
*B23B 29/04* (2006.01)

(52) U.S. Cl.
CPC ..... *B23B 2205/12* (2013.01); *B23B 2220/123* (2013.01); *B23C 2220/36* (2013.01)

(56) References Cited

U.S. PATENT DOCUMENTS

| | | | | |
|---|---|---|---|---|
| 5,203,648 | A * | 4/1993 | Bohannan | B23B 27/045 407/113 |
| 5,529,440 | A * | 6/1996 | Schmidt | B23B 27/08 407/113 |
| 5,931,613 | A * | 8/1999 | Larsson | B23B 27/08 407/103 |
| 6,074,138 | A * | 6/2000 | Jonsson | B23B 27/045 407/117 |
| 6,238,146 | B1 * | 5/2001 | Satran | B23B 27/1614 407/113 |
| 6,273,651 | B1 * | 8/2001 | Heinloth | B23C 3/06 407/116 |
| 7,063,489 | B2 * | 6/2006 | Satran | B23C 5/1072 407/113 |
| D584,752 | S * | 1/2009 | Jonsson | D15/139 |
| D605,209 | S * | 12/2009 | Jonsson | D15/139 |
| 7,909,546 | B2 * | 3/2011 | Nada | B23B 27/065 407/113 |
| 8,202,026 | B2 * | 6/2012 | Satran | B23C 5/207 407/113 |
| 8,454,276 | B2 * | 6/2013 | Uno | B23B 27/141 407/113 |
| 2005/0117981 | A1 * | 6/2005 | Satran | B23C 5/08 407/117 |
| 2008/0240880 | A1 * | 10/2008 | Durand | B23C 5/2221 409/131 |
| 2009/0162154 | A1 * | 6/2009 | Jonsson | B23B 27/045 407/114 |
| 2012/0099935 | A1 * | 4/2012 | Hecht | B23B 27/1614 407/100 |
| 2014/0050542 | A1 | 2/2014 | Zeeb et al. | |

FOREIGN PATENT DOCUMENTS

| | | | | |
|---|---|---|---|---|
| DE | 102011007076 | A1 * | 10/2012 | B23B 27/04 |
| EP | 505574 | A1 * | 9/1992 | B23C 5/06 |
| EP | 850715 | A1 * | 4/1998 | B23C 5/20 |
| GB | 2070472 | A * | 9/1981 | B23B 27/065 |
| JP | 54106986 | A * | 8/1979 | B23C 5/20 |
| JP | 06047618 | A * | 2/1994 | B23D 43/00 |
| JP | 07237027 | A * | 9/1995 | B23C 5/20 |
| JP | 2001062624 | A * | 3/2001 | B23C 5/20 |
| JP | 2004351532 | A * | 12/2004 | B23C 5/12 |
| JP | 2006281433 | A * | 10/2006 | B23C 5/20 |
| JP | WO 2012118009 | A1 * | 9/2012 | B23B 27/045 |
| JP | 2012187650 | A * | 10/2012 | B23C 5/20 |
| JP | 2013121638 | A * | 6/2013 | B23C 5/20 |
| NL | WO 9221465 | A1 * | 12/1992 | B23B 27/08 |

* cited by examiner

CUTTING TOOL AND CUTTING INSERT HAVING EXACTLY FOUR CUTTING PORTIONS THEREFOR

FIELD OF THE INVENTION

The present invention relates to metal cutting tools for use in groove turning and groove milling operations having an indexable cutting insert with a plurality of cutting portions.

BACKGROUND OF THE INVENTION

Within the field of metal cutting tools used in groove turning and groove milling operations, cutting inserts removably securable in an insert holder have long since provided a way of performing a cutting operation with a suitably hard material, i.e. cemented carbide, in the vicinity of the cutting edge, where the insert holder, manufactured from a less hard material, is reusable following the disposal of a worn or damaged cutting insert.

This type of cutting tool has been further developed to utilize indexable cutting inserts with an increased number of cutting edges, giving economic benefits from providing an increased number of cutting operations per cutting insert. This type of cutting tool has also been developed to provide a more efficient means of securing the indexable insert to the insert holder.

US 2012/0099935 discloses an indexable cutting insert having two opposing end surfaces, a peripheral side surface, and four cutting portions. The peripheral side surface has two pairs of opposing side surfaces, a first pair including four cutting portion relief surfaces, and a second pair including four cutting portion rake surfaces and four abutment zones. A minimum length dimension between the second pair of opposing side surfaces is coincident with a first plane about which the cutting insert exhibits minor symmetry. For each index position of the cutting insert within an insert holder, three of the four abutment zones are in clamping contact with three reaction zones located on a sidewall surface of the insert holder.

US 2014/0050542 discloses an indexable cutting insert having two opposing main surfaces, a peripheral side surface, and four cutting portions. The peripheral side surface has two pairs of opposing side surfaces, a first pair of short sides including four cutting portion relief surfaces and two positioning notches, and a second pair of long sides including four cutting portion rake surfaces and four locating surfaces. In a plan view of one of the main surfaces, it is clear that a radial plane containing any one of the four cutting edges does not intersect the second pair of long sides. For each index position of the cutting insert within an insert holder, one of the four locating surfaces is supported by a stop surface in an insert pocket of the holder, and one of the two positioning notches engages a positioning pin in the insert pocket.

SUMMARY OF THE INVENTION

In accordance with the present invention, there is provided an indexable cutting insert comprising two opposing end surfaces with a peripheral side surface and a central axis extending therebetween, and exactly four cutting portions,
  each of the four cutting portions having a major cutting edge formed by the intersection of a rake surface and a relief surface,
  the peripheral side surface having two pairs of opposing side surfaces, a first pair of opposing side surfaces including the four relief surfaces and a second pair of opposing side surfaces including the four rake surfaces,
  wherein in an end view:
    four cutting points on the four major cutting edges define the transitions between the first and second pairs of opposing side surfaces, and
    a minimum first length dimension between the second pair of opposing side surfaces is less than six-tenths of a minimum second length dimension between two of the four cutting points.

Also in accordance with the present invention, there is provided a cutting tool comprising an insert holder and a cutting insert of the sort described above retained therein,
  the insert holder having a holding portion extending along a longitudinal tool axis, the holding portion having a seating surface transverse to the longitudinal tool axis, and
  the cutting insert removably securable to the insert holder in any one of four index positions by a separate fastener,
    wherein exactly one cutting portion is operative, and
    wherein one end surface is in clamping contact with the seating surface.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
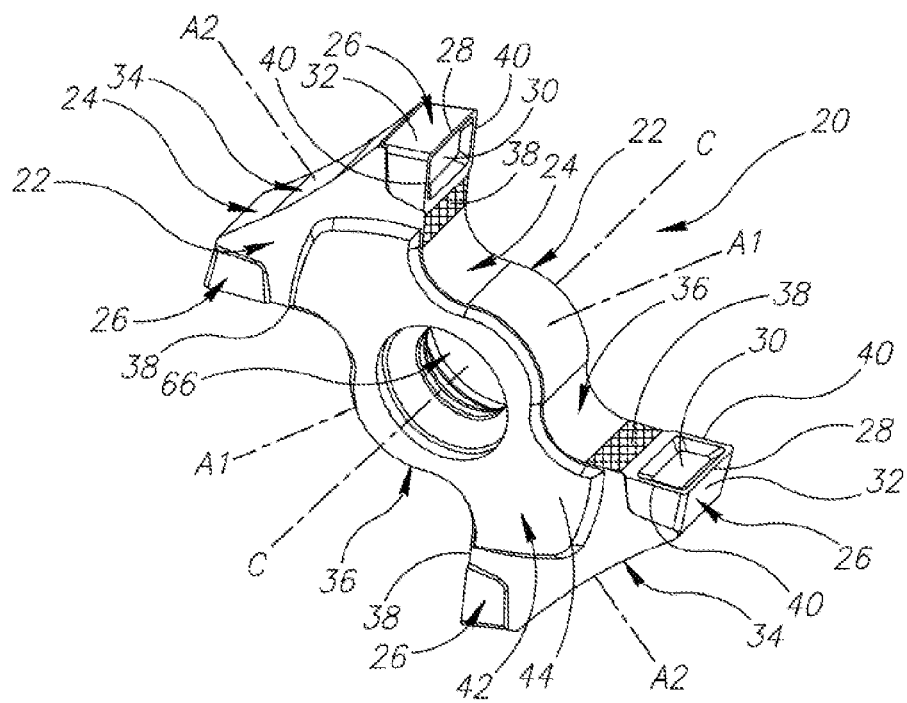
FIG. 1 is a perspective view of a cutting insert in accordance with some embodiments of the present invention.

Attention is first drawn to FIGS. 1 to 4, showing an indexable cutting insert 20 which may be manufactured by form pressing and sintering a cemented carbide, such as tungsten carbide, and may be coated or uncoated.

According to the present invention, the cutting insert 20 has two opposing end surfaces 22 with a peripheral side surface 24 and a central axis C extending therebetween, and exactly four cutting portions 26.

Each of the four cutting portions 26 has a major cutting edge 28 formed by the intersection of a rake surface 30 and a relief surface 32.

The peripheral side surface 24 has two pairs of opposing side surfaces 34, 36, a first pair of opposing side surfaces 34 including the four relief surfaces 32 and a second pair of opposing side surfaces 36 including the four rake surfaces 30.

In some embodiments of the present invention, the two opposing end surfaces 22 may be identical.

Also, in some embodiments of the present invention, the four cutting portions 26 may be identical.

Further, in some embodiments of the present invention, each major cutting edge 28 may extend from one end surface 22 to the other end surface 22.

Yet further, in some embodiments of the present invention, each major cutting edge 28 may be substantially parallel to the central axis C.

Figure 2:
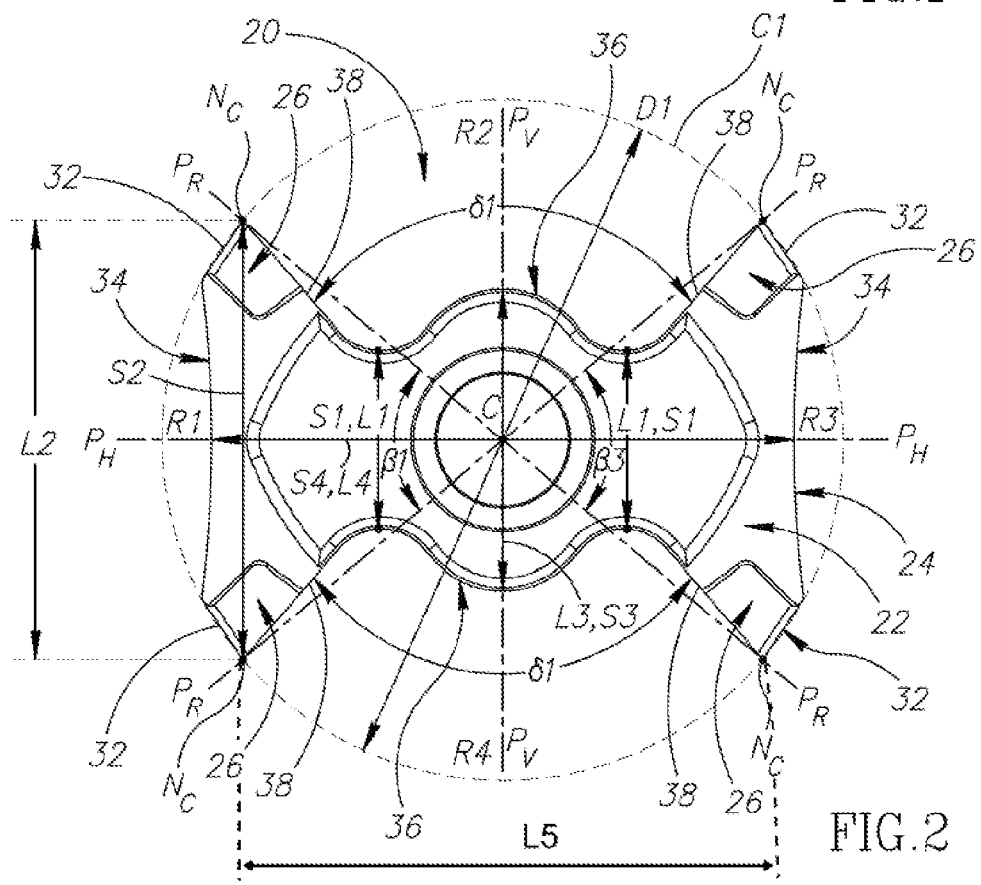
FIG. 2 is an end view of the cutting insert shown in FIG. 1.

As shown in FIG. 2, in an end view, the cutting insert 20 has a minimum first length dimension L1 between the second pair of opposing side surfaces 36, L1 being measured along an imaginary first segment S1.

As also shown in FIG. 2, in an end view of the cutting insert 20, four cutting points $N_C$ on the four major cutting edges 28 define the transitions between the first and second pairs of opposing side surfaces 34, 36, and the cutting insert 20 has a minimum second length dimension L2 between two of the four cutting points $N_C$, L2 being measured along an imaginary second segment S2.

In some embodiments of the present invention, the minimum first length dimension L1 between the second pair of opposing side surfaces 36 is less than six-tenths of the minimum second length dimension L2 between two of the four cutting points $N_C$, i.e. L1<L2*6/10.

It should be appreciated that the minimum first length dimension L1 is measured between peripheral points of the second pair of opposing side surfaces 36, in an end view of the cutting insert 20, the peripheral points being joined by the first segment S1.

Configuring the cutting insert 20 to have the minimum first length dimension L1 less than six-tenths of the minimum second length dimension L2 advantageously enables the cutting insert 20 to be secured to a mating body with an efficient use of space.

In some embodiments of the present invention, the minimum first length dimension L1 may be less than half the minimum second length dimension L2, i.e. L1<L2/2.

Also, in some embodiments of the present invention, the first segment S1 may be parallel to the second segment S2.

Further, in some embodiments of the present invention, the first segment S1 may be parallel to and offset from a vertical plane $P_v$ which contains the central axis C and passes through the second pair of opposing sides 36.

As shown in FIG. 2, the four cutting points $N_C$ may define a first imaginary circle C1 which circumscribes the peripheral side surface 24, having a first diameter D1.

Figure 3:
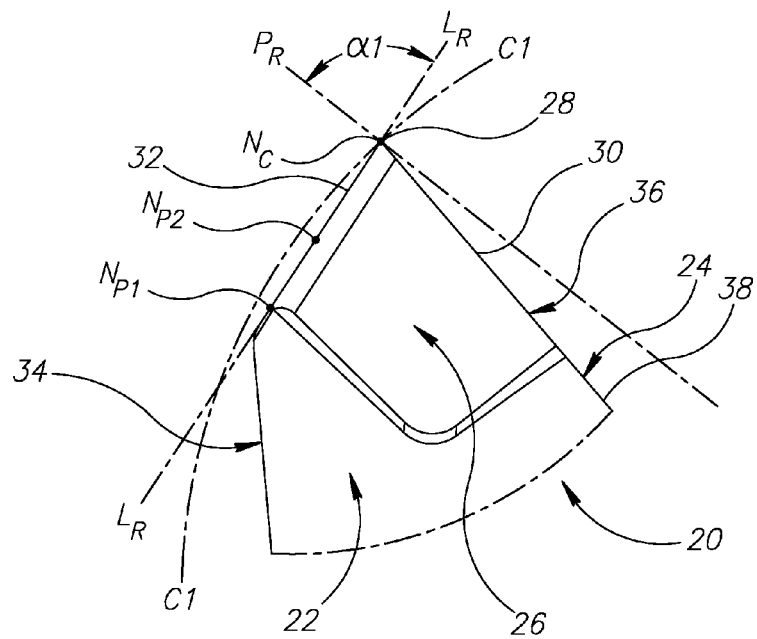
FIG. 3 is a detailed view of the cutting tool shown in FIG. 2.

As shown in FIG. 3, in a detailed end view of the cutting insert 20, a first relief point Nip on each relief surface 32 may be located further from its respective cutting point $N_C$ than a second relief point $N_P2$ on the same relief surface 32, and the first relief point Nip may be located closer to the first imaginary circle C1 than the second relief point $N_P2$.

Configuring the cutting insert 20 such that the first relief point $N_P1$ is located closer to the first imaginary circle C1 than the second relief point $N_P2$ advantageously provides robust support for the operative major cutting edge 28 during internal groove turning operations.

In some embodiments of the present invention, each of the four cutting portions 26 may have a radial plane PR containing the central axis C and its respective cutting point $N_C$.

Also, in some embodiments of the present invention, each radial plane PR may intersect the second pair of opposing side surfaces 36.

Further, in some embodiments of the present invention, each radial plane $P_R$ may be coplanar with another radial plane $P_R$.

Yet further, in some embodiments of the present invention, the first segment S1 may not intersect any of the four radial planes $P_R$.

Configuring the cutting insert 20 such that the first segment S1 does not intersect any of the four radial planes $P_R$ advantageously provides sufficient space in the vicinity of the operative cutting portion 26 to enable undisturbed chip forming.

As shown in FIG. 3, each radial plane $P_R$ may form an acute relief angle $\alpha 1$ with a straight imaginary relief line $L_R$ coincident with or tangential to the relief surface 32 immediately adjacent its respective cutting point $N_C$, and the acute relief angle $\alpha 1$ may have a value equal to or greater than 75 degrees, i.e. $\alpha 1 \geq 75°$.

Configuring the cutting insert 20 to have relief angles $\alpha 1$ equal to or greater than 75 degrees advantageously provides robust support for the operative major cutting edge 28 during internal groove turning operations.

In some embodiments of the present invention, the acute relief angle $\alpha 1$ may have a value equal to or greater than 80 degrees, i.e. $\alpha 1 \geq 80°$.

As shown in FIG. 2, the four radial planes PR may define four imaginary insert regions R1, R2, R3, R4, and the four relief surfaces 32 may be entirely located in non-adjacent first and third imaginary insert regions R1, R3.

In some embodiments of the present invention, the first and third imaginary insert regions R1, R3 may be separated by the vertical plane $P_v$.

Also, in some embodiments of the present invention, the two radial planes PR defining the first imaginary insert region R1 may form an acute first region angle $\beta 1$, and the two radial planes $P_R$ defining the third imaginary insert region R3 may form an acute third region angle $\beta 3$.

Further, in some embodiments of the present invention, the first and third region angles $\beta 1$, $\beta 3$ may have the same value, equal to or greater than 60 degrees, i.e. $\beta 1 = \beta 3 > 60°$.

Yet further, in some embodiments of the present invention, the second pair of opposing side surfaces 36 may have exactly four spaced apart abutment zones 38.

Yet still further, in some embodiments of the present invention, each abutment zone 38 may be entirely located in the first or third imaginary insert region R1, R3.

As shown in FIG. 2, in an end view of the cutting insert 20, each of the four abutment zones 38 may form a V-shape with an adjacent one of the four abutment zones 38.

Figure 4:
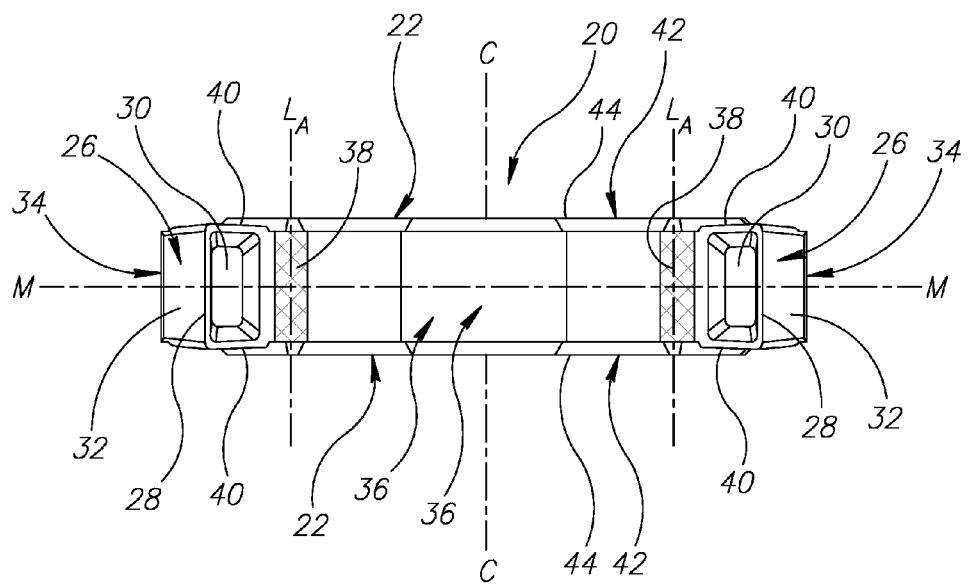
FIG. 4 is a side view of the cutting insert shown in FIG. 1.

As shown in FIG. 4, each of the four abutment zones 38 may contain a straight imaginary abutment line $L_A$ parallel to the central axis C.

In some embodiments of the present invention, each of the four abutment zones 38 may be located adjacent one of the four rake surfaces 30.

Also, in some embodiments of the present invention, each of the four abutment zones 38 may be entirely located further from the vertical plane $P_v$ than the first segment S1.

Yet further, in some embodiments of the present invention, each of the four abutment zones 38 may be planar.

As shown in FIG. 2, each of the four abutment zones 38 may form an external abutment angle $\delta 1$ of less than 180 degrees with another one of the four abutment zones 38, i.e. $\delta < 180°$.

In some embodiments of the present invention, the external abutment angle δ1 may have a value between 60 degrees and 120 degrees, i.e. 60°<δ1<120°.

It should be appreciated that use of the term "external angle" throughout the description and claims refers to an angle between two planar and/or linear components as measured external to the member on which these components are formed.

As shown in FIG. 4, each cutting portion 26 may have two minor cutting edges 40, and each minor cutting edge 40 may extend away from its associated major cutting edge 28 in a direction towards a median plane M perpendicular to the central axis C.

In some embodiments of the present invention, at least one of the two opposing end surfaces 22 may include a central boss 42 protruding therefrom, and each central boss 42 may have a raised support surface 44 located axially further away from the median plane M than any point on the four cutting portions 26 located on the same side of the median plane M.

Configuring the cutting insert 20 with raised support surfaces 44 advantageously enables modification of the four cutting portions 26 to achieve multiple product variants without modifying the support surfaces 44.

Also, in some embodiments of the present invention, each support surface 44 may be substantially planar and perpendicular to the central axis C.

Configuring each support surface 44 to be planar and perpendicular to the central axis C advantageously facilitates accurate and repeatable indexing of the cutting insert 20.

Further, in some embodiments of the present invention, the cutting insert 20 may exhibit minor symmetry about the median plane M.

As shown in FIG. 2, the cutting insert 20 may exhibit mirror symmetry about the vertical plane $P_V$.

For embodiments of the present invention where the cutting insert 20 exhibits minor symmetry about the vertical plane $P_V$, the cutting insert 20 may have two instances of a minimum first length dimension L1 between the second pair of opposing side surfaces 36.

In some embodiments of the present invention, a horizontal plane $P_H$ perpendicular to the vertical plane $P_V$ and containing the central axis C may pass through the first pair of opposing sides 34.

Also, in some embodiments of the present invention, the cutting insert 20 may exhibit minor symmetry about the horizontal plane $P_H$.

For embodiments of the present invention where the cutting insert 20 exhibits minor symmetry about the vertical and horizontal planes $P_V$, $P_H$, the cutting insert 20 may be indexed by performing 180° rotation about the central axis C, 180° rotation about a first axis A1 lying in the vertical plane $P_V$ and perpendicular to the central axis C, or 180° rotation about a second axis A2 lying in the horizontal plane $P_H$ and perpendicular to the central axis C.

As shown in FIG. 2, in an end view, the cutting insert 20 has a third length dimension L3 extending along the vertical plane $P_V$ between the second pair of opposing sides 36, L3 being measured along an imaginary third segment S3. Additionally, the cutting insert 20 has a fourth length dimension L4 extending along the horizontal plane $P_H$ between the first pair of opposing sides 34, L4 being measured along an imaginary fourth segment S4. Finally, a fifth length dimension L5 measured between two adjacent cutting points Nc located on the same side of the horizontal plane $P_H$, in a direction parallel to the horizontal plane $P_H$, is less than the fourth length dimension L4.

In some embodiments of the present invention, the minimum first length dimension L1 between the second pair of opposing sides 36 is less than the third length dimension L3 along the vertical plane $P_V$ between the second pair of opposing sides 36, which in turn is less than the minimum second length dimension L2 between two of the four cutting points $N_C$, which in turn is less than the fourth length dimension L4 along the horizontal plane $P_H$ between the first pair of opposing sides 34.

Figure 5:
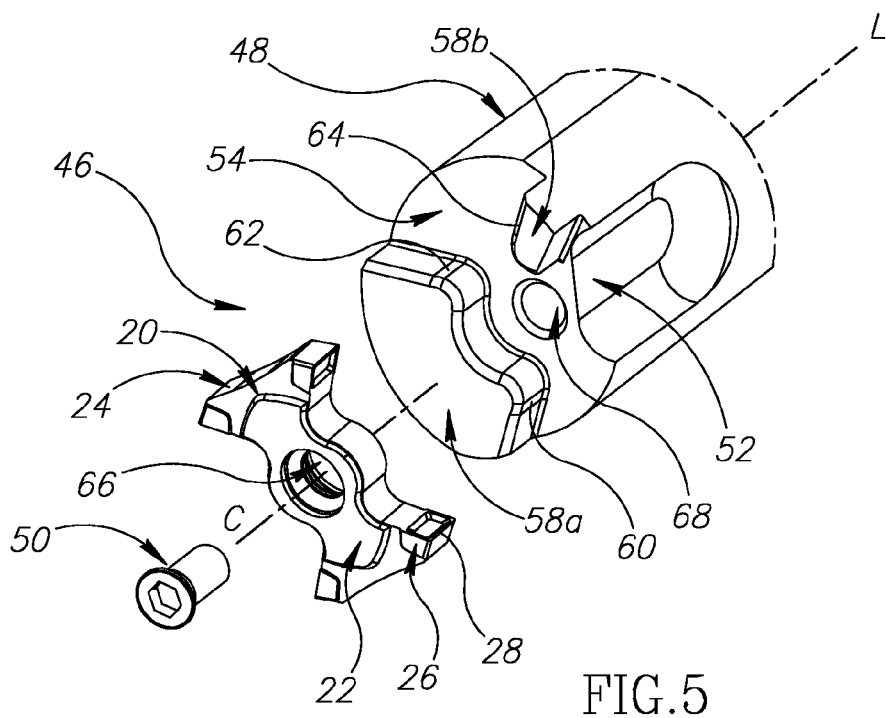
FIG. 5 is an exploded perspective view of a cutting tool in accordance with some embodiments of the present invention.
Figure 6:
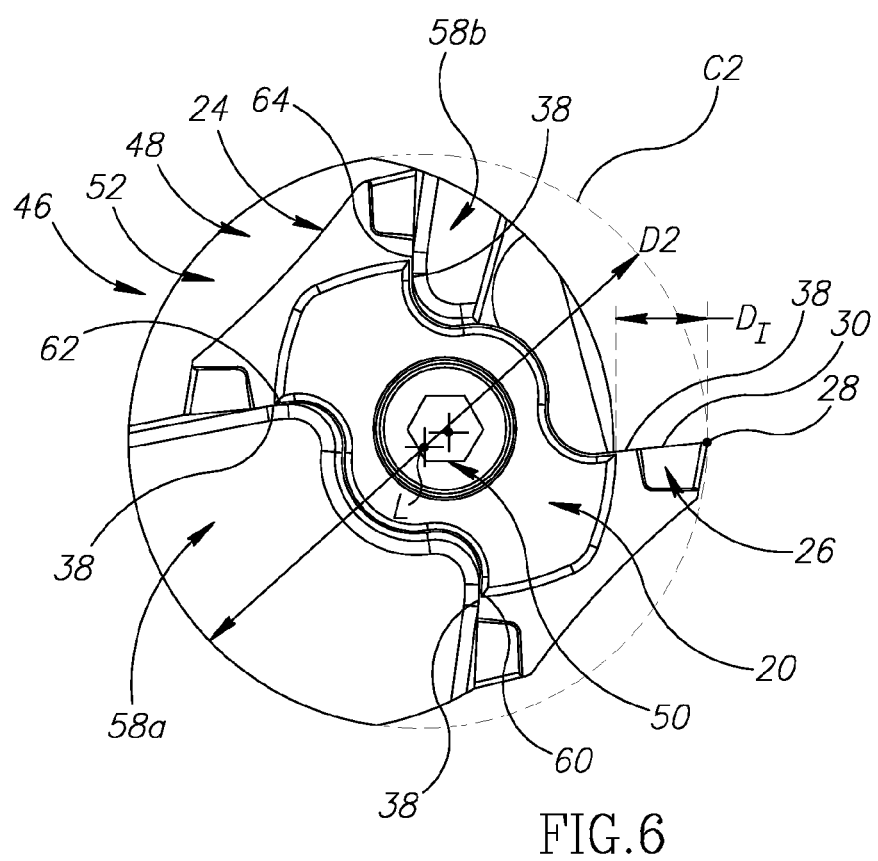
FIG. 6 is an end view of the cutting tool shown in FIG. 5, with a shank portion of an insert holder removed.

Attention is now drawn to FIGS. 5 to 6, showing a cutting tool 46 according to the present invention, comprising an insert holder 48 and the cutting insert 20 retained therein.

The cutting insert 20 is removably securable to the insert holder 48 in any one of four index positions by a separate fastener 50, and exactly one cutting portion 26 is operative in each index position.

The insert holder 48 has a holding portion 52 extending along a longitudinal tool axis L.

The holding portion 52 has a seating surface 54 transverse to the longitudinal tool axis L, and one end surface 22 of the cutting insert 20 is in clamping contact with the seating surface 54.

In some embodiments of the present invention, the seating surface 54 may be substantially planar and perpendicular to the longitudinal tool axis L.

Figure 7:
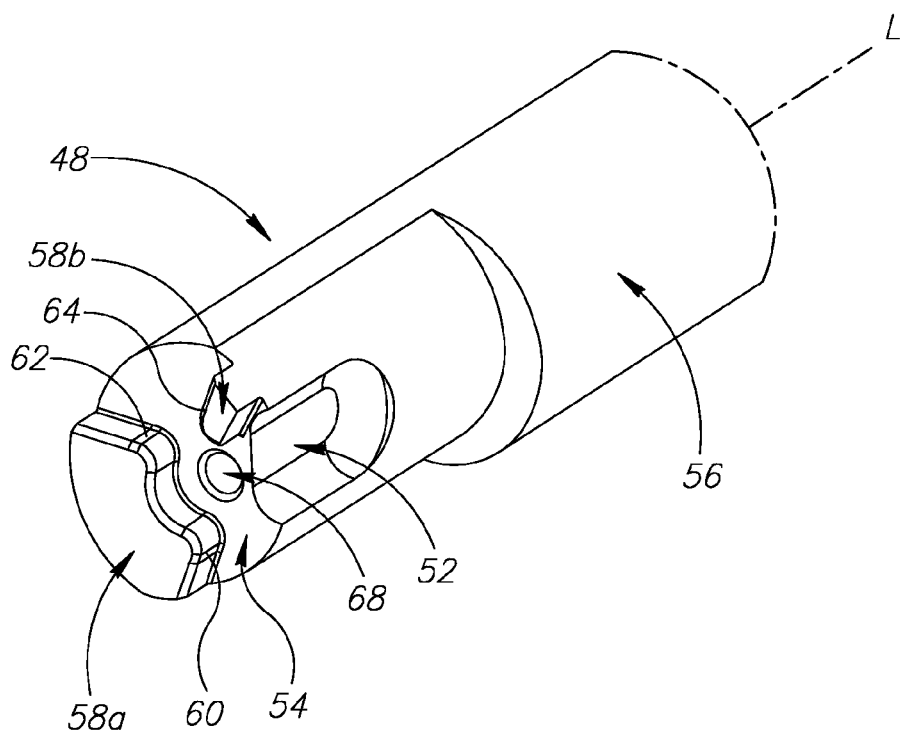
FIG. 7 is a perspective view of the insert holder in accordance with some embodiments of the present invention.

As shown in FIG. 7, the holding portion 52 may be elongated and longitudinally extend away from a shank portion 56.

As shown in FIG. 6, in an end view of the cutting tool 46, a second imaginary circle C2 having a second diameter D2 may contain the cutting insert 20 and the entire holding portion 52.

In some embodiments of the present invention, the operative cutting portion 26 may have a depth of insertion $D_I$ perpendicular to the longitudinal tool axis L, and the depth of insertion $D_I$ may be equal to or greater than one-tenth of the second diameter D2, i.e. D1≥D2/10.

Also, in some embodiments of the present invention, the first imaginary circle's first diameter D1 may have a value equal to or greater than three quarters of the second imaginary circle's second diameter D2, i.e. D1>D2*3/4.

It should be appreciated that the depth of insertion $D_I$ represents the cutting tool's maximum cutting depth during internal groove turning operations.

Configuring the cutting tool 46 such that the depth of insertion $D_I$ is equal to or greater than one-tenth of the second diameter D2 advantageously enables the cutting tool 46 to perform internal groove turning operations at cutting depths equal to or greater than one-tenth of the bore diameter of the workpiece within which the holding portion 52 extends.

In some embodiments of the present invention, the holding portion 52 may have three reaction surfaces 60, 62, 64 adjacent the seating surface 54, and for each index position, three of the cutting insert's four abutment zones 38 may be in clamping contact with the three reaction surfaces 60, 62, 64.

Also, in some embodiments of the present invention, the three reaction surfaces 60, 62, 64 may each extend transversely to the seating surface 54.

Further, in some embodiments of the present invention, the single abutment zone 38 not in clamping contact with the three reaction surfaces 60, 62, 64 may be located adjacent the rake surface 30 of the operative cutting portion 26.

Configuring the cutting tool 46 with the non-operative abutment zone 38 adjacent the rake surface 30 of the operative cutting portion 26 advantageously provides sufficient space in the vicinity of the operative cutting portion 26 to enable undisturbed chip forming.

Figure 8:
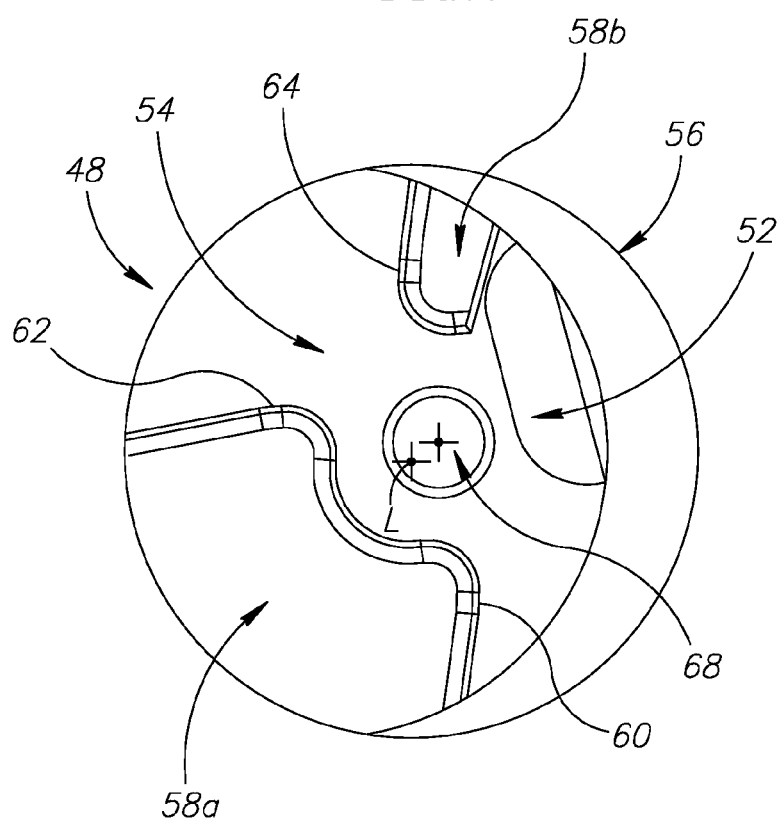
FIG. 8 is an end view of the insert holder shown in FIG. 7.

As shown in FIGS. 7 and 8, two spaced apart protuberances 58a, 58b may protrude from the seating surface 54, and two of the three reaction surfaces 60, 62 may be located on a first protuberance 58a and the third reaction surface 64 may be located on a second protuberance 58b.

Configuring the insert holder 48 with two spaced apart protuberances 58a, 58b advantageously enables the single cutting insert 20 to be secured to the insert holder 48 with an efficient use of space.

In some embodiments of the present invention, a central bore 66 coaxial with the central axis C may extend between and open out to the two opposing end surfaces 22 of the cutting insert 20.

Also, in some embodiments of the present invention, the fastener 50 may be in the form of a clamping screw extending through the cutting insert's central bore 66 and engaging a threaded bore 68 in the seating surface 54 of the holding portion 52.

Further, in some embodiments of the present invention, the threaded bore 68 may be eccentric in relation to the central bore 66.

Although the present invention has been described to a certain degree of particularity, it should be understood that various alterations and modifications could be made without departing from the spirit or scope of the invention as hereinafter claimed.

What is claimed is:

1. An indexable cutting insert (20) comprising two opposing end surfaces (22) with a peripheral side surface (24) and a central axis (C) extending therebetween, and exactly four cutting portions (26),
   each of the four cutting portions (26) having a major cutting edge (28) formed by the intersection of a rake surface (30) and a relief surface (32),
   the peripheral side surface (24) having two pairs of opposing side surfaces (34, 36), a first pair of opposing side surfaces (34) including the four relief surfaces (32) and a second pair of opposing side surfaces (36) including the four rake surfaces (30),
   wherein in an end view:
   four cutting points (Nc) on the four major cutting edges (28) define the transitions between the first and second pairs of opposing side surfaces (34, 36),
   each of the four cutting portions (26) has a radial plane (PR) containing the central axis (C) and its respective cutting point (Nc);
   each radial plane (PR) intersects the second pair of opposing side surfaces (36);
   the insert has a minimum first length dimension (L1) between the second pair of opposing side surfaces (36), the minimum first length dimension (L1) being measured along an imaginary first segment (S1) that is parallel to and offset from a vertical plane ($p_V$) containing the central axis (C); and
   the minimum first length dimension (L1) between the second pair of opposing side surfaces (36) is less than a minimum second length dimension (L2) between two of the four cutting points (Nc).

2. The indexable cutting insert (20) according to claim 1, wherein each radial plane ($P_R$) contains two of the four cutting points ($N_C$).

3. The indexable cutting insert (20) according to claim 1, wherein the imaginary first segment (S1) does not intersect any of the four radial planes ($P_R$).

4. The indexable cutting insert (20) according to claim 1, wherein each radial plane ($P_R$) forms an acute relief angle ($\alpha 1$) with a straight imaginary relief line ($L_R$) coincident with or tangential to the relief surface (32) immediately adjacent its respective cutting point (Nc), and
   wherein the acute relief angle ($\alpha 1$) has a value equal to or greater than 75 degrees.

5. The indexable cutting insert (20) according to claim 1, wherein the four radial planes ($P_R$) define four imaginary insert regions (R1, R2, R3, R4), and wherein the four relief surfaces (32) are entirely located in non-adjacent first and third imaginary insert regions (R1, R3).

6. The indexable cutting insert (20) according to claim 1, wherein the imaginary first segment (S1) is parallel to an imaginary second segment (S2) along which the minimum second length dimension (L2) is measured.

7. The indexable cutting insert (20) according to claim 1, wherein the cutting insert (20) exhibits mirror symmetry about the vertical plane ($P_V$).

8. The indexable cutting insert (20) according to claim 1, wherein each cutting portion (26) has two minor cutting edges (40), and
   wherein each minor cutting edge (40) extends away from its associated major cutting edge (28) in a direction towards a median plane (M) perpendicular to the central axis (C).

9. A cutting tool (46) comprising an insert holder (48) and a cutting insert (20) in accordance with claim 1 retained therein,
   the insert holder (48) having a holding portion (52) extending along a longitudinal tool axis (L), the holding portion (52) having a seating surface (54) transverse to the longitudinal tool axis (L), and
   the cutting insert (20) removably securable to the insert holder (48) in any one of four index positions by a separate fastener (50),
   wherein exactly one cutting portion (26) is operative, and
   wherein one end surface (22) is in clamping contact with the seating surface (54).

10. The indexable cutting insert (20) according to claim 1, wherein:
    the cutting insert has a horizontal plane ($P_H$) which is perpendicular to the vertical plane ($P_V$), contains the central axis (C) and passes through the first pair of opposing side surfaces (34); and
    a fifth length dimension (L5) measured between two adjacent cutting points (Nc) located on the same side of the horizontal plane ($P_H$), is less than a fourth length dimension (L4) between the first pair of opposing side surfaces (34) measured at the horizontal plane ($P_H$).

11. The indexable cutting insert (20) according to claim 1, wherein:
    the minimum first length dimension (L1) is less than six-tenths of the minimum second length dimension (L2).

12. The indexable cutting insert (20) according to claim 5, wherein the second pair of opposing side surfaces (36) has four spaced apart abutment zones (38), and
    wherein each abutment zone (38) is entirely located in the first or third imaginary insert region (R1, R3).

13. The indexable cutting insert (20) according to claim 5, wherein the two radial planes ($P_R$) defining the first imaginary insert region (R1) form an acute first region angle ($\beta 1$), and the two radial planes ($P_R$) defining the third imaginary insert region (R3) form an acute third region angle ($\beta 3$).

14. The cutting tool (46) according to claim 9, wherein the holding portion (52) has three reaction surfaces (60, 62, 64) adjacent the seating surface (54),
- wherein the second pair of opposing side surfaces (36) has exactly four spaced apart abutment zones (38), and
- wherein for each index position, three of the four abutment zones (38) are in clamping contact with the three reaction surfaces (60, 62, 64).

15. The cutting tool (46) according to claim 9, wherein in an end view of the cutting tool (46), a second imaginary circle (C2) having a second diameter (D2) contains the cutting insert (20) and the entire holding portion (52),
- wherein the operative cutting portion (26) has a depth of insertion ($D_I$) perpendicular to the longitudinal tool axis (L), and
- wherein the depth of insertion ($D_I$) is equal to or greater than one-tenth of the second diameter (D2).

16. The cutting tool (46) according to claim 14, wherein each of the four cutting portions (26) has a radial plane ($P_R$) containing the central axis (C) and its respective cutting point (Nc),
- wherein the four radial planes ($P_R$) define four imaginary insert regions (R1, R2, R3, R4), and the four relief surfaces (32) are entirely located in non-adjacent first and third imaginary insert regions (R1, R3), and
- wherein each abutment zone (38) is entirely located in the first or third imaginary insert region (R1, R3).

17. The cutting tool (46) according to claim 14, wherein two spaced apart protuberances (58a, 58b) protrude from the seating surface (54), and
- wherein two of the three reaction surfaces (60, 62) are located on a first protuberance (58a) and the third reaction surface (64) is located on a second protuberance (58b).

18. An indexable cutting insert (20) comprising two opposing end surfaces (22) with a peripheral side surface (24) and a central axis (C) extending therebetween, and exactly four cutting portions (26),
- each of the four cutting portions (26) having a major cutting edge (28) formed by the intersection of a rake surface (30) and a relief surface (32),
- the peripheral side surface (24) having two pairs of opposing side surfaces (34, 36), a first pair of opposing side surfaces (34) including the four relief surfaces (32) and a second pair of opposing side surfaces (36) including the four rake surfaces (30), wherein in an end view:
- four cutting points (Nc) on the four major cutting edges (28) define the transitions between the first and second pairs of opposing side surfaces (34, 36),
- the cutting insert exhibits mirror symmetry about a vertical plane ($P_V$) which contains the central axis (C) and passes through the second pair of opposing side surfaces (36);
- the cutting insert has a horizontal plane ($P_H$) which is perpendicular to the vertical plane ($P_V$), contains the central axis (C) and passes through the first pair of opposing side surfaces (34); and
- a minimum first length dimension (L1) between the second pair of opposing side surfaces (36) is less than a third length dimension (L3) between the second pair of opposing side surfaces (36) measured at the vertical plane ($P_V$), which in turn is less than a minimum second length dimension (L2) between two of the four cutting points (Nc), which in turn is less than a fourth length dimension (L4) between the first pair of opposing side surfaces (34) measured at the horizontal plane ($P_H$).

19. The indexable cutting insert (20) according to claim 18, wherein:
- a fifth length dimension (L5) measured between two adjacent cutting points (Nc) located on the same side of the horizontal plane ($P_H$), is less than the fourth length dimension (L4).

20. The indexable cutting insert (20) according to claim 18, wherein the four cutting points (Nc) define a first imaginary circle (C1) which circumscribes the peripheral side surface (24).

21. The indexable cutting insert (20) according to claim 20, wherein in an end view:
- a first relief point (N $N_P1$) on each relief surface (32) is located further from its respective cutting point (Nc) than a second relief point ($N_P2$) on the same relief surface (32), and
- the first relief point ($N_P1$) is located closer to the first imaginary circle (C1) than the second relief point ($N_P2$).

* * * * *